United States Patent [19]

Syed et al.

[11] Patent Number: 5,125,711
[45] Date of Patent: Jun. 30, 1992

[54] REMOVABLE MOTOR VEHICLE SEAT

[75] Inventors: Imtiyaz A. Syed, Canton; Omar D. Tame, West Bloomfield, both of Mich.

[73] Assignee: Hoover Universal, Inc., Plymouth, Mich.

[21] Appl. No.: 662,490

[22] Filed: Feb. 28, 1991

[51] Int. Cl.⁵ .............................................. B60N 2/04
[52] U.S. Cl. ................................ 296/68.1; 248/503.1; 297/216
[58] Field of Search ................ 296/63, 65.1, 68.1; 297/216, 336, 344; 248/501, 503.1

[56] References Cited

U.S. PATENT DOCUMENTS

| | | | |
|---|---|---|---|
| 821,319 | 5/1906 | Swan | 248/503.1 |
| 3,897,101 | 7/1975 | Hess | 296/68.1 |
| 4,759,580 | 7/1988 | Berklich et al. | 296/65.1 |
| 4,773,693 | 9/1988 | Premji et al. | 296/65.1 |
| 4,846,526 | 7/1989 | Allen | 297/216 X |
| 4,865,377 | 9/1989 | Musser et al. | 296/68.1 |
| 4,909,571 | 3/1990 | Vidwans et al. | 296/216 X |
| 4,971,379 | 11/1990 | Rumpel et al. | 296/63 |

FOREIGN PATENT DOCUMENTS 2700474  7/1978  Fed. Rep. of Germany ...... 297/216
3248056  6/1984  Fed. Rep. of Germany ...... 248/503

Primary Examiner—Dennis H. Pedder
Attorney, Agent, or Firm—Harness, Dickey & Pierce

[57] ABSTRACT

A seat mounting system for a removable motor vehicle seat. The mounting system incorporates a pair of seat mounting latch assemblies laterally displaced at the rear of the vehicle seat and which engage with mounting bars secured to the motor vehicle structure. One of the seat mounting latches features a manually actuated mechanism for engaging the mounting bar. On the opposite lateral side of the seat, an inertia sensitive seat mounting latch is provided which engages the locking bar when a forward deceleration force is applied onto the vehicle as in the case of vehicle impact. By providing one of the latching mechanisms with an automatically operating inertia mechanism, only one of the latch mounts needs to have a manually actuated release. In addition, this configuration avoids the requirement of remote actuation of a pair of separated latches. The manual actuated mechanism of this invention also has means for cinching against the mounting bar to reduce seat rattling.

7 Claims, 4 Drawing Sheets

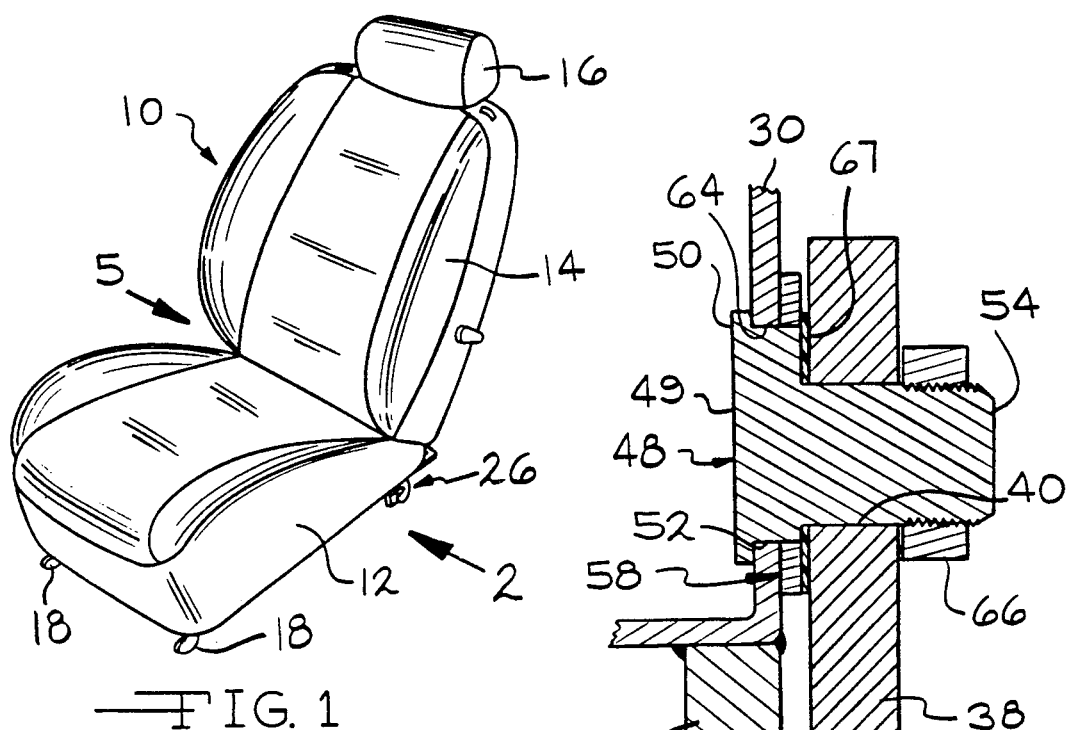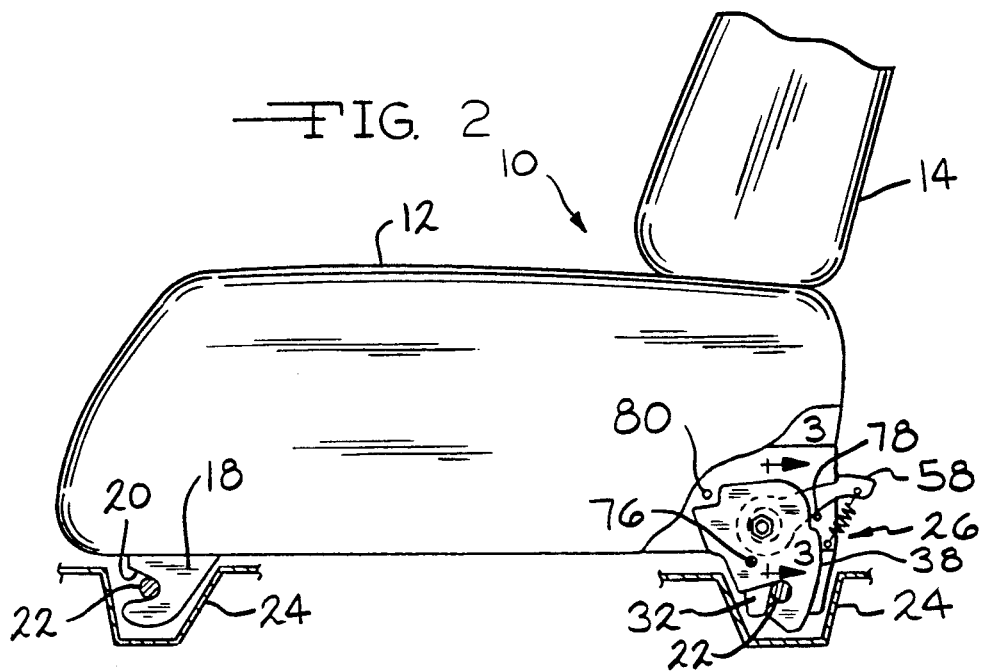

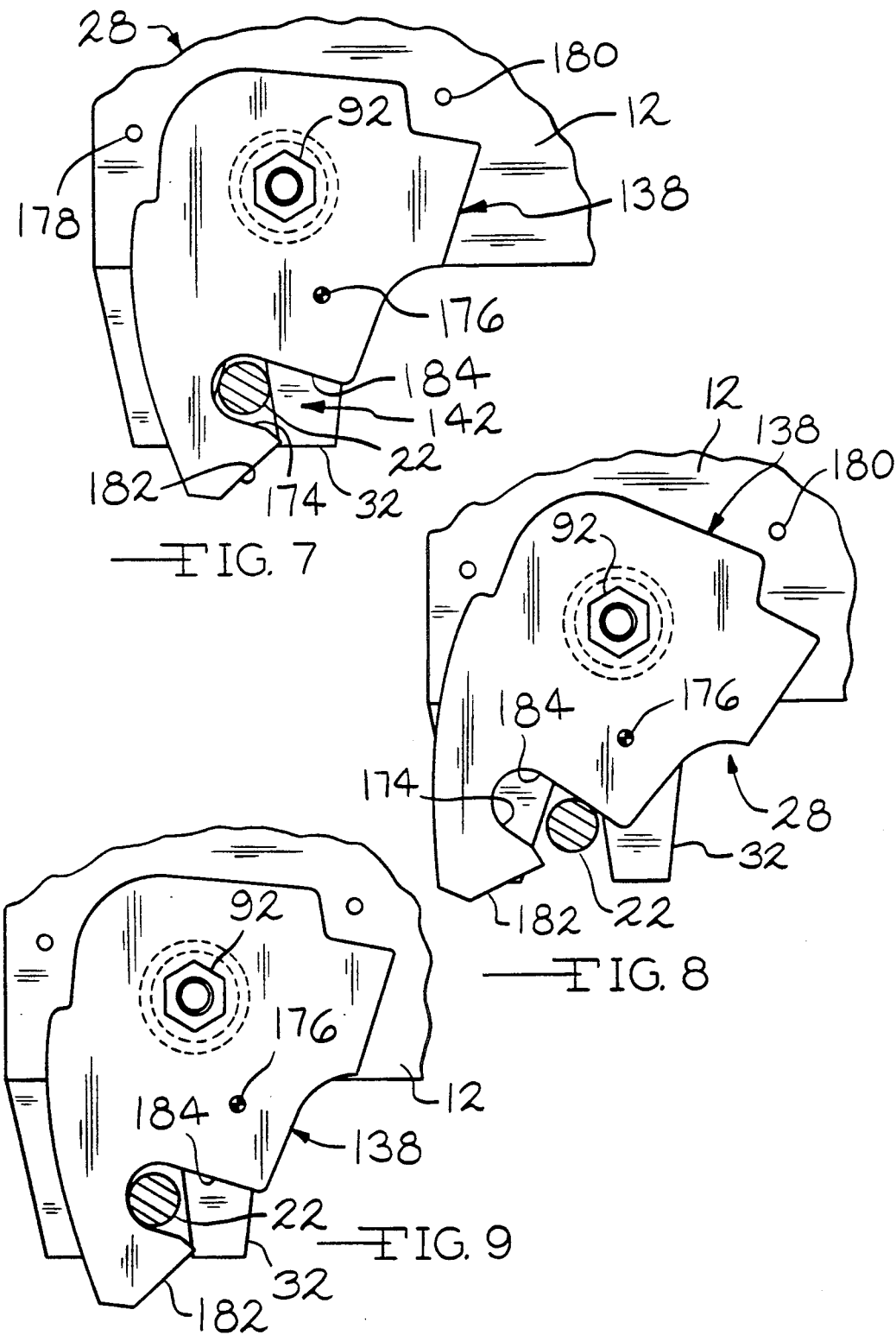

REMOVABLE MOTOR VEHICLE SEAT

BACKGROUND AND SUMMARY OF THE INVENTION

This invention relates to a seat for a motor vehicle and particularly to one of the type being removably fastened to the vehicle structure.

In some types of motor vehicles, and in particular multipurpose passenger vehicles (MPV's) there is a demand for passenger seats which can be installed to carry passengers or conveniently removed to provide a large compartment area for transporting articles. Irrespective of the design of the mounting system for a removable seat, it must have a high degree of structural integrity since extreme loads can be put on the mounting structure in the event of vehicle impact.

Various designs for removable seat mounting mechanisms are presently used in vehicles today. In order to provide the necessary structural integrity, the mounting system typically engages the floor pan of the vehicle below the front and rear edges of the seat, often pairs of front and rear seat mounts are provided at the four corners of the seat bottom. For these types of seats the forward laterally mounting points are merely hinge points with the rear mounts having a latching mechanism. Once the rear mounts are released, the seat can be pivoted forward and pulled from the forward seat mounts. The seat mounting points on the vehicle are typically comprised of bars or other structural features which are positioned below the floor pan surface in seat mounting sockets.

Since releasable mounting systems are required to have a high degree of structural integrity, some type of secure latching mechanism is required. In order to remove a seat having a pair of separate rear mounts the mechanisms are either designed to have separate release levers which must be simultaneously actuated by the user to remove the seat, or some type of remote control system is provided in which the pair of latches are both actuated through a single lever or release. Providing two separately actuated release mechanisms has the disadvantage that they must both be actuated simultaneously, which can be inconvenient to the user. If a single release mechanism is employed with a remote control system, a cable, torsion rod or another remote control element must be provided which adds to the complexity and costs of the seat mechanism.

Another shortcoming present in some existing seat mounting systems is their tendency to allow the seat to rattle against the seat mounts provisions, leading to undesirable noise and customer complaints.

In accordance with the present invention, a seat mounting system is provided which overcomes the previously mentioned shortcomings of prior art seat mounting mechanisms. In the seat of the present invention, two laterally separated rear latching mechanisms are provided. One of the latching mechanisms is a manually actuated release in which a latch plate is caused to engage and disengage a mounting bar attached to the vehicle floor pan. The latch plate is mounted to pivot about an eccentric cam such that it is cinched through spring tension to firmly clamp against the mounting bar, thereby reducing the possibility of rattling problems. Another releasable latch mechanism is provided which does not require a manual release since it is inertia sensitive, and will engage with a mounting bar in the event that the vehicle is subjected to a deceleration load above a certain level as might be expected in a vehicle impact. In the absence of the deceleration load, however, the inertia sensitive latch mechanism releases automatically when the manually actuated latch is released and the seat is pulled from its mounts. By providing a combination of a manually actuated and an inertia actuated latch, the requirement of dual manual release or remote actuation is eliminated. The design of the present invention also provides the significant advantage that an identical latch plate can be used for both the inertia sensitive latch and the manually actuated latch, thereby simplifying assembly and reducing the number of unique components which comprise the seat structure.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of a motor vehicle seat incorporating the mounting mechanisms of the present invention.

FIG. 2 is a partial side view taken in the direction of arrow 2 from FIG. 1 which is partially cut away to show in greater detail the outboard seat mounting latch mechanism.

FIG. 3 is a cross sectional view of the latch mechanism from FIG. 2 taken along line 3—3 from that figure.

FIGS. 7, 8 and 9 are enlarged fragmentary views of the inertially actuated seat mounting latch mechanism of FIG. 5 shown in various operating positions.

DETAILED DESCRIPTION OF THE INVENTION

Figure 4:
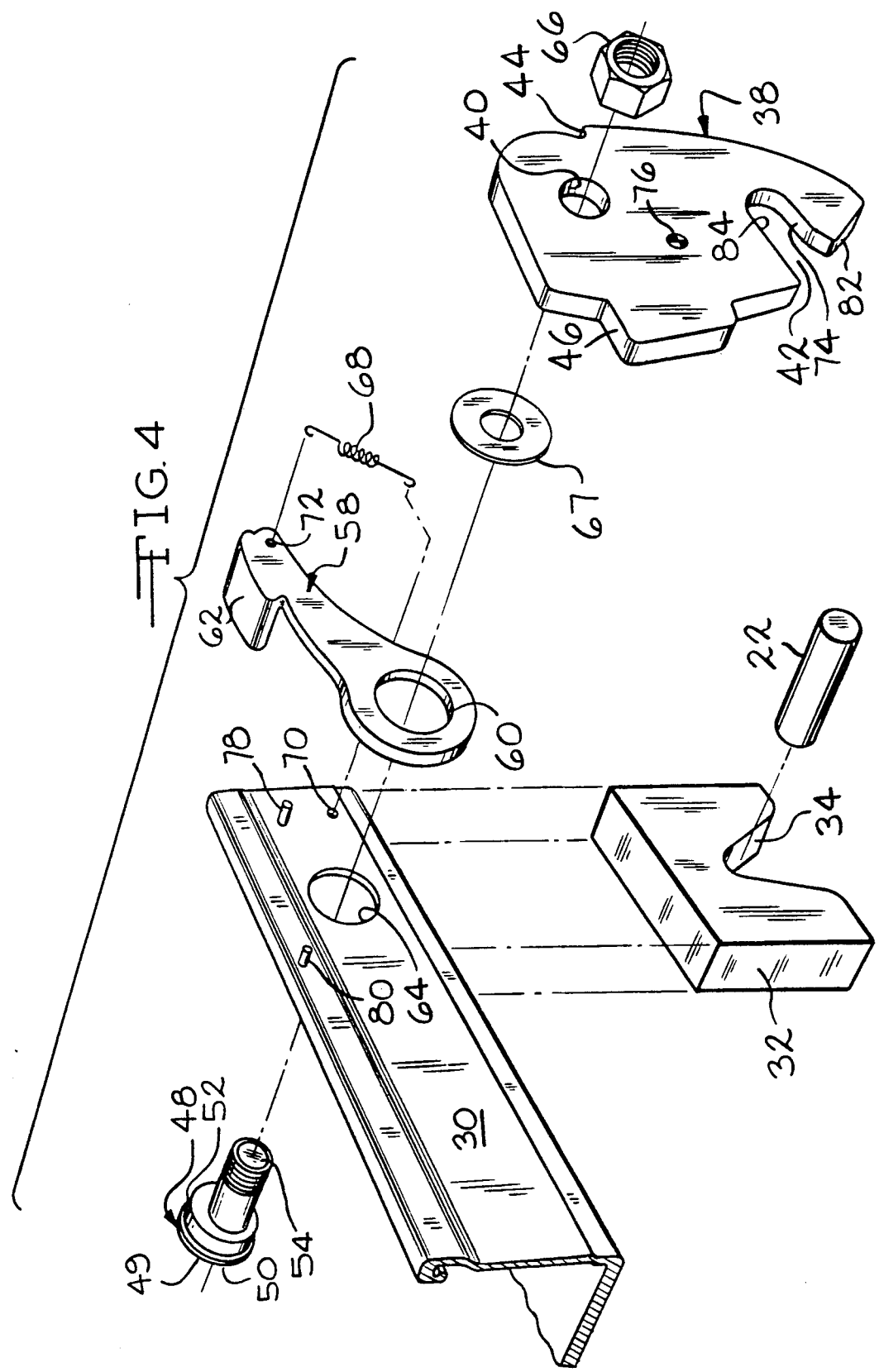
FIG. 4 is an exploded pictorial view of the outboard mechanism shown in FIGS. 2 and 3.

A motor vehicle seat having latch mechanisms in accordance with this invention is shown in FIG. 1 and is generally designated there by reference number 10. Seat 10 has the seat bottom 12, back 14, and head restraint 16.

Seat 10 has provisions for enabling it to be securely mounted to the motor vehicle floor pan yet can be conveniently removed as required. Seat 10 is designed to face the direction of normal forward travel of the motor vehicle. At the forward edge of seat bottom 12, a pair of forward opening hooks 18 are provided as best shown in FIG. 2. The forward facing notch 20 of hooks 18 engages mounting bars 22 which are provided in separated mounting sockets 24 which are attached to the vehicle floor pan or are made integral with the floor pan.

Motor vehicle seat 10 also includes a pair of separated rear mounting latch assemblies 26 and 28. While seat 10 could be mounted in various positions within a motor vehicle, seat mounting latch 26 will be designated an outboard latch assembly and is partially shown in FIG.

1, and in greater detail in FIGS. 2, 3 and 4. Seat mounting latch 28 is designated as an inboard latch assembly shown in detail in FIGS. 5 and 6. As mentioned previously, seat 10 includes both a manually actuated seat mounting latch and an inertia sensitive or automatic releasing latch. Seat mounting latch 26 is a manually actuated latch mechanism and latch 28 is inertially actuated.

With reference to FIG. 4, manually actuated latch 26 is shown in detail. Seat frame rail 30 is shown which comprises a structural portion of the seat frame, a pair of which are positioned at both the inboard and the outboard sides of seat 10. Attached to frame rail 30 is a projecting notched plate 32 having a downward opening notch 34 which engages with mounting bar 22. Notched plate 32 supports the weight of the seat and occupant against the rearward positioned mounting bars 22.

Without some additional latch provisions to engage the rear mounting bars 22, seat 10 would be free to rotate about the forward mounting bars 22 if the seat were pushed by an occupant, or if the vehicle experienced a deceleration force. As shown in FIGS. 2 through 4, seat mounting latch 26 also includes a pivotable latch plate 38 having a pivot bore 40. Latch plate 38 also defines a forward facing engagement notch 42, and notches 44 and 46 which are provided to limit the range of angular pivoting of latch plate 38. Mounting bolt 48 is provided to assemble the components of latch 26 and includes an enlarged head 49 with a radially projecting flange 50 and a cylindrical surface 52 concentric with the bolt head. A reduced diameter cylindrical post 54 projects from the mounting bolt head 49 and is eccentrically positioned with respect to the head.

Mounting bolt 48 is journaled for rotation through rail hole 64. Actuation lever 58 includes a circular aperture 60 and an actuation tab 62. Actuation lever 58 is pressed onto mounting bolt 48 and has an interference fit with cylindrical surface 52 so that it can be used to rotate mounting bolt 48. Latch plate 38 is journaled for free pivoting movement about pivot bore 40 on eccentric mounting bolt post 54. The elements are maintained in an assembled condition by threading nut 66 onto post 54. Antifriction washer 67 made of a suitable material is provided to allow latch plate 38 to freely pivot. A tension spring 68 is provided having a pair of ends, one of which engages frame rail 30 at aperture 70, and the other which engages aperture 72 of lever 58. Tension spring 68 biases lever 58 in a clockwise direction, when viewing the elements of latch 26 as presented in FIG. 2.

FIG. 2 illustrates the orientation of the elements of seat mounting latch 26 when the seat is mounted. In this condition, latch plate 38 is rotated in a clockwise direction so that mounting bar 22 is engaged both by notched plate 32 and latch plate engagement notch 42. As is evident from FIG. 2, latch plate 38 and notched plate 32 cooperate to trap bar 22, thus preventing the seat from being withdrawn. Due to the biasing of spring 68 acting on actuation lever 58, mounting bolt 48, through eccentric post 54, exerts an upward force on latch plate 38. This occurs since the center of eccentric post 54 is forward of the center of rail hole 64. The lower surface 74 of engagement notch 42 defines a concave surface so that, as latch plate 38 is cinched up, the latch plate is maintained firmly in engagement with mounting bar 22. Due to this cinching effect, latch plate 38 and notched plate 32 are securely clamped against bar 22, thus reducing the possibility of seat rattling problems. When it is desired to release mounting latch 2 and remove seat 10, an upward or counter clockwise force is exerted on actuation lever tab 62. Due to the eccentricity of mounting bolt post 54, latch plate 38 is caused to drop slightly such that the lower surface 74 of the latch plate no longer engages mounting bar 22. In that condition, latch plate 38 rotates in a counter-clockwise direction on its own accord, due to the fact that its center of gravity 76 positioned as shown in FIGS. 2 and 4, is positioned forward of its point of rotation about bolt post 54. This rotation is sufficient to allow mounting bar 22 to escape from latch plate engagement notch 42. A pair of pins 78 and 80 are fastened to frame rail 30 and are provided to limit the angular motion of latch plate 38. Pin 78 engages with notch 44 when latch plate 38 reaches its extreme counter-clockwise rotated position, whereas pin 80 engages notch 46 to restrain the plate at its extreme clockwise rotated position.

When seat 10 is removed from the vehicle and it is desired to replace it, the forward seat mounting hooks 18 are first engaged with the forward positioned mounting bars 22. Thereafter, seat 10 is rotated downwardly about the front mounting bars 22, bringing notched plate 32 and seat mounting latch 26 (and 28) into engagement with rearward mounting bars 22. The lowermost ramped surface 82 of latch plate 38 engages mounting bars 22, rotating the latch plate so that the mounting bars are engaged by forward facing engagement notch 42. The upper surface 84 of engagement notch 42 is angled with respect to pivot bore 40 to interact with the mounting bar 22, causing the plate to be cammed to rotate clockwise into the fully engaged position shown in FIG. 2 when a downward force is exerted on the seat.

Figure 6:
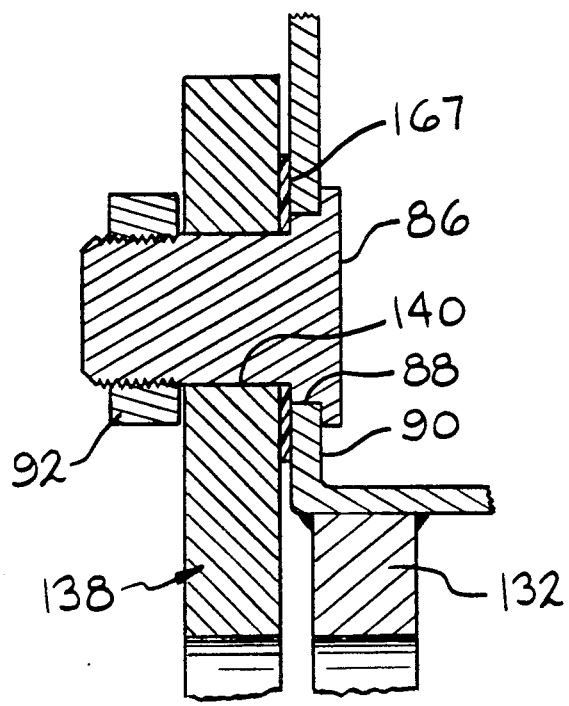
FIG. 6 is a cross sectional view of the latch mechanism shown in FIG. 5 taken along lines 6—6 from that Figure.

Now with specific reference to FIGS. 5 and 6, inertia sensitive seat mounting latch 28 will be described in detail. Seat mounting latch 28 differs from latch 26 in that it automatically operates and is not manually released. Seat mounting latch 28 responds to inertial loads to engage with the rear mounting bars 22, but when the vehicle is not subjected to deceleration loads, it can be released without manual actuation. In accordance with a significant advantage of the present invention, seat mounting latch 28 employs a latch plate having a configuration identical to that used for manually actuated seat mounting latch 26. Many of the elements and features of seat mounting latch 28 are identical to those of seat mounting latch 26 and are identified by like reference numbers with 100 added to them. Since these elements are identical, a separate description of them is unnecessary.

Since seat mounting latch 28 does not incorporate an eccentric mounting bolt, that element is replaced by mounting bolt 86 which is pressed into hole 88 of frame rail 90 and is secured by nut 92. Washer 167 provides an antifriction effect for pivoting of the latch plate. Latch 28 also does not incorporate actuation lever 58 and spring 68. In other respects, however, latch plate 138 is identical to latch plate 38, and in fact, a common part can be used for both applications.

Figure 5:
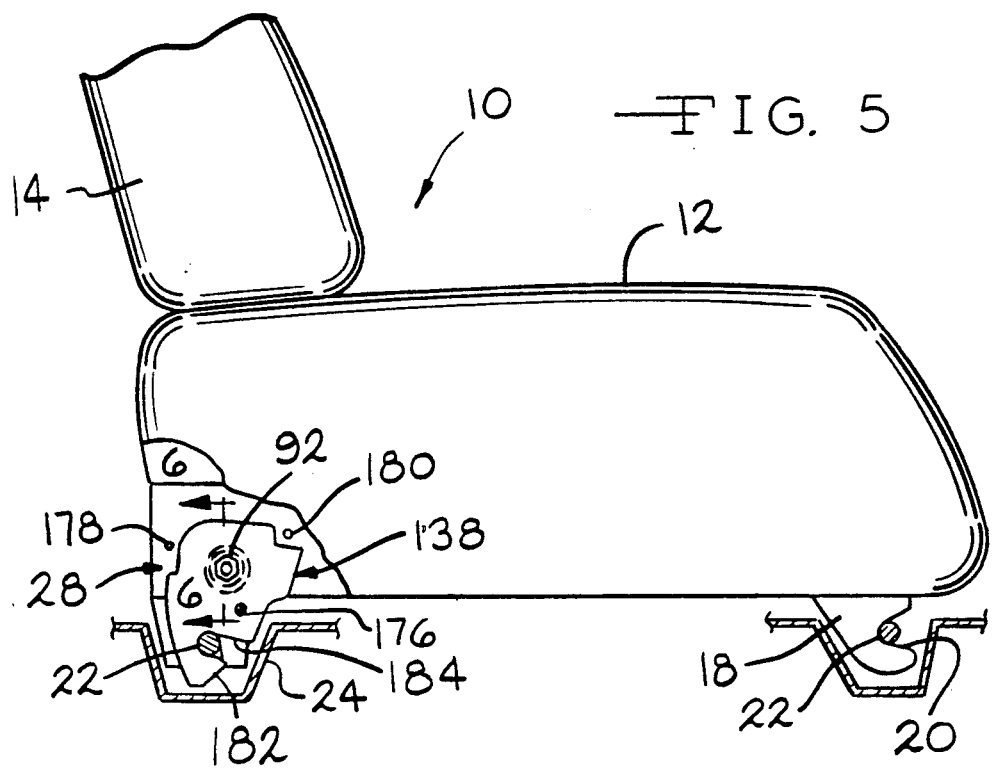
FIG. 5 is a partial side elevational view of the seat shown in FIG. 1 taken in the direction of arrow 5 which is partially cut away to show the details of the inboard inertially actuated seat mounting latch mechanism.

FIG. 5 represents the orientation of the element of seat mounting latch 28 in a normal operating condition when seat 10 is mounted in position. In the event the user wishes to remove the seat, seat mounting latch 26 is manually actuated and the seat is forced to rotate about the forward mounting bars 22. As seat bottom 12 is lifted, mounting bar 22 no longer engages either upper or lower surface 184 or 174 of latch plate 138. See FIG. 7. The clearance between the mounting bar 22 and the latch plate 133 have been exaggerated for illustration in FIGS. 7 and 9. Due to the positioning of the center of gravity 176 of latch plate 138, it is biased to rotate in a clockwise direction, as viewed in FIGS. 5, 7, 8 and 9, allowing forward facing engagement notch 142 to escape from its engagement with mounting bar 22, see FIG. 8, and allowing the seat to be removed. As stated previously, since seat mounting latch 28 operates automatically, it does not have to be separately actuated and thus does not require a remote actuation system or separate manual release lever.

If the vehicle is subjected to a forward deceleration load above some predetermined level while seat 10 is fastened to the vehicle, that deceleration will exert an inertial force on latch plate 138, acting through center of gravity of 176. Since the center of gravity 176 is positioned below pivot bore 40, a counter-clockwise rotational force is exerted on the latch plate, thus maintaining it in engagement with mounting bar 22. If the seat pitches forward slightly, mounting bar 22 will engage with lower latch plate surface 174, see FIG. 9, which as stated previously is concave shaped and, therefore, tends to retain the latch plate in engagement with the mounting bar.

When seat 10 is removed from the vehicle and being installed, latch plate 138 behaves in a manner identical to that of latch plate 38 in that lower surface 182 engages mounting bar 22, rotating the latch plate to a position where the latch bar will engage upper surface 184 which urges latch plate 138 into its engaged position. Surface 184 maintains latch plate 138 in a position of engagement with bar 22 so long as a downward force is present on the latch 28. This feature enables latch 28 to react quickly to deceleration loads, since it does not have to move from its normal position to engage. As with latch plate 38, latch plate 138 also includes means for limiting its range of angular motion through engagement with posts 178 and 180.

While the above description constitutes the preferred embodiments of the present invention, it will be appreciated that the invention is susceptible of modification, variation and change without departing from the proper scope and fair meaning of the accompanying claims.

We claim:

1. A motor vehicle passenger seat of the type being conveniently removable from and replaceable in a vehicle and which mounts to a plurality of mounting elements secured to the vehicle, said seat comprising:

a first pair of laterally separated hooks positioned at the front of said seat, each hook engageable with a respective mounting element;

a second pair of laterally separated hooks positioned at the rear of said seat, each hook engageable with a respective mounting element;

a first seat mounting latch adjacent to one of said rear hooks having a first latch plate engageable with one of said mounting elements in a lock position to lock said seat in place and a manual release lever for moving said latch plate from said lock position with said one mounting element to a release position with said one mounting element, said first latch plate when in said release position being automatically pivotal from engagement with to disengagement from said one mounting element as the rest of the seat is lifted in the absence of a forward deceleration force acting on said vehicle;

a second seat mounting latch adjacent the other rear hook having a second latch plate identical with said first latch plate, said second latch plate pivotally mounted to said seat and being automatically pivotal from engagement with to disengagement from another of said mounting elements as the rear of the seat is lifted in the absence of a forward deceleration force acting on said vehicle.

2. A motor vehicle passenger seat according to claim 1 wherein said second latch plate is mounted to said seat for pivotal movement about a pivot axis and a has a forwardly opening notch below said pivot axis engageable with said another mounting element and wherein the center of gravity of said second latch plate is located below said pivot axis such that said forwardly opening notch is urged into engagement with said another mounting element in response to said deceleration force.

3. A motor vehicle passenger seat according to claim 2 wherein said center of gravity is positioned forward of said pivot axis, and said forwardly opening notch defines an upper surface resting upon said another mounting element to prevent rotation of said second latch plate in a direction to move said notch rearwardly away from said another mounting element but which, upon lifting of the rear of said seat, said upper surface cams said second latch plate with respect to said another mounting element to enable rotation of said second latch plate to withdraw said notch from said another mounting element.

4. The seat of claim 1 further comprising:

a forwardly opening notch in said first latch plate engageable with said one mounting element and wherein said first latch plate is pivotable about a pivot axis located above said forwardly opening notch;

a pivot pin rotationally mounted to a frame member of said seat and having an eccentric pivot member that defines said pivot axis of said first latch plate whereby rotation of said pivot pin in a first direction causes said pivot member and said first latch plate to be raised to said lock position in which a lower surface of said first latch plate notch engages said one mounting element causing said one mounting element to be clamped between said notched plate and said first latch plate to hold said seat in place;

said release lever being coupled to said pivot pin to enable said pivot pin to be rotated in a second direction opposite said first direction causing said eccentric pivot member and said first latch plate to be lowered to said release position and, said first latch plate having a center of gravity below said pivot axis and forward of said pivot axis so that upon rotation of said eccentric pivot member in said second direction, said lower surface disengages from said one mounting element to enable rotation of said first latch plate to withdraw said notch from said one mounting element; and biasing means for urging said pivot pin in said first direction to move said latch plate to said lock position.

5. A motor vehicle passenger seat according to claim 4 wherein said second latch plate is mounted to said seat for pivotal movement about a pivot axis and has a forwardly opening notch engageable with said another mounting element and wherein the center of gravity of said second latch plate is located between said pivot axis and said forward opening notch such that said forwardly opening notch is urged into engagement with said another mounting element in response to said deceleration force.

6. A motor vehicle passenger seat according to claim 5 wherein said center of gravity of said second latch plate is positioned forward of said pivot axis, and said forwardly opening notch defines an upper surface resting upon said another mounting element to prevent rotation of said second latch plate in a direction to move said notch rearwardly away from said another mounting element but which, upon lifting of the rear of said seat, said upper surface cams said second latch plate with respect to said another mounting element to enable rotation of said second latch plate to withdraw said notch from said another mounting element.

7. The motor vehicle passenger seat of claim 6 wherein said first and second latch plates have lowermost ramped surfaces that engage the mounting elements upon lowering of said seat onto said mounting elements to rotate said latch plates rearward so that the mounting elements are engaged by said forward facing notches.

* * * * *

UNITED STATES PATENT AND TRADEMARK OFFICE
CERTIFICATE OF CORRECTION

| | | |
|---|---|---|
| PATENT NO. | : | 5,125,711 |
| DATED | : | June 30, 1992 |
| INVENTOR(S) | : | Syed et al. |

It is certified that error appears in the above-identified patent and that said Letters Patent is hereby corrected as shown below:

Column 5, line 66, claim 1, delete "rest" and insert --rear--.

Signed and Sealed this

Seventh Day of September, 1993

Attest:

BRUCE LEHMAN

*Attesting Officer*    *Commissioner of Patents and Trademarks*